United States Patent [19]
West

[11] Patent Number: 5,485,335
[45] Date of Patent: Jan. 16, 1996

[54] MAGNETIC RECORD/REPRODUCE HEAD HAVING IMPROVED SERVICE LIFE, AND NEW MATERIAL THEREFOR

[75] Inventor: Bradford D. West, Del Mar, Calif.

[73] Assignee: Eastman Kodak Company, Rochester, N.Y.

[21] Appl. No.: 308,878

[22] Filed: Sep. 19, 1994

Related U.S. Application Data

[63] Continuation of Ser. No. 886,562, May 19, 1992, abandoned.

[51] Int. Cl.⁶ ................................................. C04B 35/36
[52] U.S. Cl. .................. 360/122; 360/102; 428/143; 428/212; 428/323; 428/325; 428/697; 428/699; 428/701; 428/702
[58] Field of Search ........................ 360/122, 102; 428/701, 697, 212, 702, 699, 323, 325, 143

[56] References Cited

U.S. PATENT DOCUMENTS

| | | | |
|---|---|---|---|
| 4,670,805 | 6/1987 | Onitsuka et al. | 360/103 |
| 4,833,556 | 5/1989 | Kosarko et al. | 360/102 |
| 4,975,398 | 12/1990 | Brar et al. | 501/136 |
| 5,026,614 | 6/1991 | Itoh et al. | 428/469 |
| 5,031,064 | 7/1991 | Ashikawa et al. | 360/122 |
| 5,052,099 | 1/1991 | Taguchi et al. | 360/122 |

*Primary Examiner*—Archene Turner
*Attorney, Agent, or Firm*—William F. Noval

[57] ABSTRACT

There is disclosed a magnetic head particularly suited for high frequency applications. The head has a ceramic body of a new ceramic material which provides longer service life together with a high level of operating efficiency and cost effectiveness. The head includes a core of magnetic material, such as thin layers of the metal FeAlSi, bonded to pieces of the ceramic material. The coefficients of thermal expansion of the ceramic and the core are suitably matched to permit wide temperature excursions (e.g., 500° C.) during manufacture of the head. The ceramic is a matrix of a material such as a metal titanate in which are distributed hard inclusions such as a metal oxide which are tightly bound to the matrix to preclude pull out of the inclusions during machining of the ceramic. The wear resistance and other characteristics of the magnetic head are greatly improved compared to a comparable head made with manganese nickel oxide ceramic, for example.

12 Claims, 3 Drawing Sheets

MAGNETIC RECORD/REPRODUCE HEAD HAVING IMPROVED SERVICE LIFE, AND NEW MATERIAL THEREFOR

This is a Continuation of U.S. application Ser. No. 886,562, filed 19 May 1992, now abandoned.

FIELD OF THE INVENTION

The present invention relates to an improved magnetic record/reproduce head for very high frequency systems, and, more particularly, to such a head and to a new material therefor having substantially improved wear characteristics which result in a much longer service life of the head together with a high level of operating efficiency and cost effectiveness.

BACKGROUND OF THE INVENTION

Magnetic record/reproduce heads intended for use at frequencies as high as several hundred megahertz (MHz) are advantageously made of very thin films of magnetic material laminated onto a non-magnetic substrate (typically ceramic). These parts are then bonded together into a precisely polished and dimensioned head assembly. Using well known process steps, a suitable magnetic material, such as a metal alloy of FeAlSi (known as "Sendust"), is deposited by film deposition in very thin layers onto a thin substrate of a tough non-magnetic material, such as a small highly polished piece of ceramic. After a suitable number of layers of the magnetic metal have been deposited onto the substrate, a small piece of the substrate and its magnetic metal layers are bonded to another similar piece with the magnetic layers sandwiched between thin outer pieces of the substrate. The pieces so joined are precisely cut and polished to a mirror-like finish along a face at right angles to the magnetic layers. They are then bonded together with a non-magnetic insulating material such as silica ($SiO_2$) so that the faces are closely and precisely aligned opposite each other. These opposed faces thus form a high efficiency magnetic "air gap" for the head. In order to obtain very high frequency response (e.g., 150 MHz and higher) and good magnetic and electrical efficiency, important dimensions of the head, such as the depth of the air gap and thicknesses of the magnetic layers, must be very small and extremely precise (e.g., measured in microns). The outer surface of the magnetic head where it bears against a magnetic recording medium (e.g., a magnetic tape) is highly polished to near perfect smoothness and is very small in length and width. The wear-resistance and other characteristics of this outer surface are very important.

In the course of manufacturing a thin-film magnetic head such as just described, the magnetic metal layers of the core and the ceramic substrate are subjected to elevated temperatures of the order of 500° C. This necessarily occurs during the annealing of the magnetic core and during a step of bonding together parts of the head with molten $SiO_2$. Because it is necessary to subject the metal and ceramic portions of the head assembly to such a large temperature excursion (e.g., between about 500° C. and ambient), the thermal coefficient of expansion of the ceramic material used must be suitably matched to that of the metal of the magnetic core. If their respective thermal coefficients are enough different the ceramic and metal parts of the head will delaminate upon heating and/or subsequent cooling to ambient temperature. This requirement of suitably matched thermal coefficients imposes a significant restriction on the choice of a ceramic for the head assembly.

The toughness and the cutting, grinding and polishing characteristics of a ceramic are also important factors in selecting this material for use in a magnetic head such as described above. If the ceramic material is prone to be chipped, cracked or even microscopically fractured during the machining and processing operations in fabricating the ceramic and metal core into a magnetic head, a substantial number of heads may be ruined. Such defects due to the ceramic may occur at various stages of manufacture and these defects add considerably to the cost of the overall head manufacturing process. Moreover, because latent defects are difficult to detect, the "average" performance level of heads accepted as "good" is, in fact, somewhat degraded. It is highly desirable therefor that the ceramic material used in a head have good machining properties, that it be tough and fracture resistant, and that it be free of voids and stresses when finished.

In certain applications where the magnetic head is deliberately kept slightly separated from the magnetic medium in a record/reproduce system (e.g., a hard disk read-write data system typically used in computers), physical wear of the magnetic head is not a problem. Because the head not being in contact with the magnetic medium, relative motion between the two does not induce wear of the head. But in those applications where the head is necessarily in contact with the magnetic medium, such as in a tape recording system intended for use at frequencies as high as several hundred MHz, physical wear of the head becomes a major concern. The tape and head in such a system are moved relatively past each at very high speed (e.g., as high as 75 m/sec.). Because of aerodynamic factors and the need to keep the head in contact with the tape, a small positive pressure is applied between head and tape to keep them in intimate contact. The surface of the tape, which is typically formulated of a magnetic oxide, acts on the head as a buffing and lapping medium. Even though the ceramic of which the head is made is hard relative to most materials, it nonetheless is gradually worn away by the continual rubbing action of the tape. The kind of wear, whether the wear is "fracture" or "deformation" controlled, and the rate at which wear occurs are important factors in determining the useful life of the magnetic head. By way of example, a head with a ceramic body of MnNi oxide (widely used in the industry under the designation "MN-130") and a laminated metal core of "Sendust" can be worn-away to the point of catastrophic head failure in as little as 800 hours. The rate and degree of wear depends also upon such factors as the type of tape used in a system, the relative speed of the tape past the head, and the small amount of pressure needed to keep the head in contact with the tape. Moreover, differential wear of the magnetic core relative to the ceramic body can result in a condition termed "washout" (to be explained in detail hereinafter) which results in progressive loss of sensitivity of the head. Thus the wear characteristics of such a magnetic head are very important.

It is highly desirable, both from the standpoint of cost and of system efficiency, that a magnetic head have a service life considerably longer than 800 hours. The present invention provides an efficient and cost effective solution to the problems and limitations with a magnetic head, and with its ceramic body, such as described above.

SUMMARY OF THE INVENTION

In accordance with the present invention there is provided a magnetic head having extended service life and which is suitable for use in a high frequency record/reproduce system. The head comprises a magnetic core of thin films of suitable magnetic metal (e.g., "Sendust") laminated between outer pieces of a new ceramic material having improved wear resistance as well as other important characteristics needed with such a head. The core of the head is fabricated by known thin-film deposition of the metal layers onto the ceramic material. The ceramic material (also part of the invention) has a thermal coefficient of expansion suitably matched to that of the metal core so that wide excursions in temperature during fabrication of the head do not cause loss in magnetic efficiency and delamination of the metal from the ceramic. This new ceramic material also has substantially improved toughness, resistance to chipping and cracking, ease of machining and polishing, wear resistance, and cost effectiveness compared with a known, widely used ceramic such as "MN-130". By virtue of these factors, the service life of this new magnetic head has a substantially longer service life compared to a closely similar head of "MN-130". For example, the service life of a head made of "MN-130" with a "Sendust" core is only about 800 hours in one type of high frequency tape record/reproduce-system intended for use at 150 MHz or higher. By contrast, the service life of a magnetic head made according to the present invention and used under the same conditions in this tape system has a service life of thousands of hours (e.g., as long or longer than 5000 hours).

In accordance with an aspect of the present invention, there is provided a new ceramic material particularly suitable for use in a high frequency magnetic head. This ceramic material in one specific example comprises a ceramic matrix of substantially pure material, such as calcium titanate ($CaTiO_3$), in which a percentage by weight of finely divided inclusions of hard material (such as alumina or zirconia) are uniformly dispersed as a second phase (not in solid solution). The material of the ceramic matrix is chosen to have a thermal coefficient of expansion suitably matched to that of the magnetic core of the head. The matrix material is also chosen to have toughness, resistance to chipping and cracking, ease of processing and machining, and low cost. The addition of a small percent by weight of the hard inclusions to the ceramic matrix substantially increases the wear resistance of the composite ceramic but does not adversely affect the thermal coefficient of expansion or the other characteristics of the ceramic material which are necessary in a high performance magnetic head such as described above. The hard inclusions in the ceramic matrix are tightly bound or bonded in the matrix but are not dissolved in it (not in solid solution). Being tightly bonded to the matrix, the hard inclusions will not break away ("pull out") to leave microscopic voids during cutting or polishing of the ceramic material, or during the service life of the magnetic head in which it is used. This is most important. Moreover, this new ceramic material can be polished to a surface finish measured in tens of Angstroms in spite of its toughness and wear resistance. The wear resistance of this new ceramic material can be adjusted to a desired value by adjusting the percent by weight of the hard inclusions to that of the material of the matrix. By way of example, the wear resistance of the ceramic material provided by the invention can be increased from about twice that of the ceramic "MN-130" to more than 10 times that of "MN-130". Thus the wear of a magnetic head can be tailored to the requirements of various system parameters, including head "washout", as is explained in greater detail hereinbelow.

In accordance with another aspect of the invention, the new ceramic material is made according to the following criteria. These are: 1. Small uniform grain size of substantially pure raw materials (and no "glass-formers" such as $SiO_2$). 2. Uniform distribution of the hard inclusions (e.g., metal oxide) as a second phase in the first phase ceramic matrix (e.g., metal titanate). 3. Suitable thermal expansion match between ceramic matrix and inclusions. 4. Low internal stresses in the finished ceramic (i.e., correct stoichiometry and no third phase formation). 5. Full density of the finished material (no pores). Starting with a known processing step, a finely divided matrix powder of a suitable material such as a metal titanate and a suitable percentage by weight of the finely divided hard inclusions (e.g., a suitable metal oxide) are batch mixed as a slurry in a binder solution. The slurry is then dried and compacted into a "green" ceramic piece. The "green" piece is treated to burn out the binder and is then sintered in an oxygen atmosphere (according to conventional conditions of time and temperature) to consolidate the ceramic to a density of 95–97%. At this density, the small pores in the material are no longer interconnected. Next, the ceramic part is heated and pressurized to eliminate its residual porosity and to obtain 100% density (no pores). This is readily done in a hot isostatic press using a high pressure atmosphere (termed "HIP'ing"). Inert argon is used as the atmospheric gas during HIP'ing. But during the HIP'ing operation, the metal titanate of the ceramic matrix is partly reduced (because of the presence of graphite heating elements in the HIP furnace). It is highly desirable therefore (or the reasons given in detail hereinbelow) that the HIP'ed ceramic part be subsequently annealed in a pure oxygen atmosphere. The conditions for oxygen annealing are otherwise the same as for sintering. The annealed ceramic piece is then cut to size, polished and fabricated into a thin-film magnetic head as described above.

In accordance with yet another aspect of the invention, there is provided a magnetic head comprising: a magnetic core of a suitable magnetic material, the magnetic material having a thermal coefficient of expansion; and a ceramic body having a thermal coefficient of expansion substantially matched to that of the magnetic core, the ceramic body being a tough, chip resistant ceramic matrix in which are dispersed a desired percent by weight of very fine hard inclusions not in solid solution, the inclusions being tightly bound in the matrix to resist pull out during polishing and wear of the head against a magnetic medium, the wear resistance of the ceramic body being substantially increased to a desired value by the percent weight of the inclusions such that the service life of the magnetic head is much longer than that of a comparable head made with a manganese nickel oxide ceramic body.

In accordance with still another aspect of the invention, there is provided a ceramic material especially suited for use in a magnetic head. This ceramic material comprises a matrix of a material such as a metal titanate having toughness, ease of machining, and a coefficient of thermal expansion which is suitably matched to that of a magnetic core; and a suitable percent by weight of hard inclusions such as a metal oxide which are compatible with and distributed as a second phase within the matrix, the inclusions being tightly bound to the material of the matrix to preclude pull out during machining of the ceramic, the ceramic having substantially 100% density, such that wear-resistance and other characteristics of the ceramic when used in a magnetic head are greatly improved.

The invention will be better understood from a consideration of the following detailed description taken in conjunction with the accompanying drawings and claims.

The drawings are not necessarily to scale.

DETAILED DESCRIPTION

Figure 1:
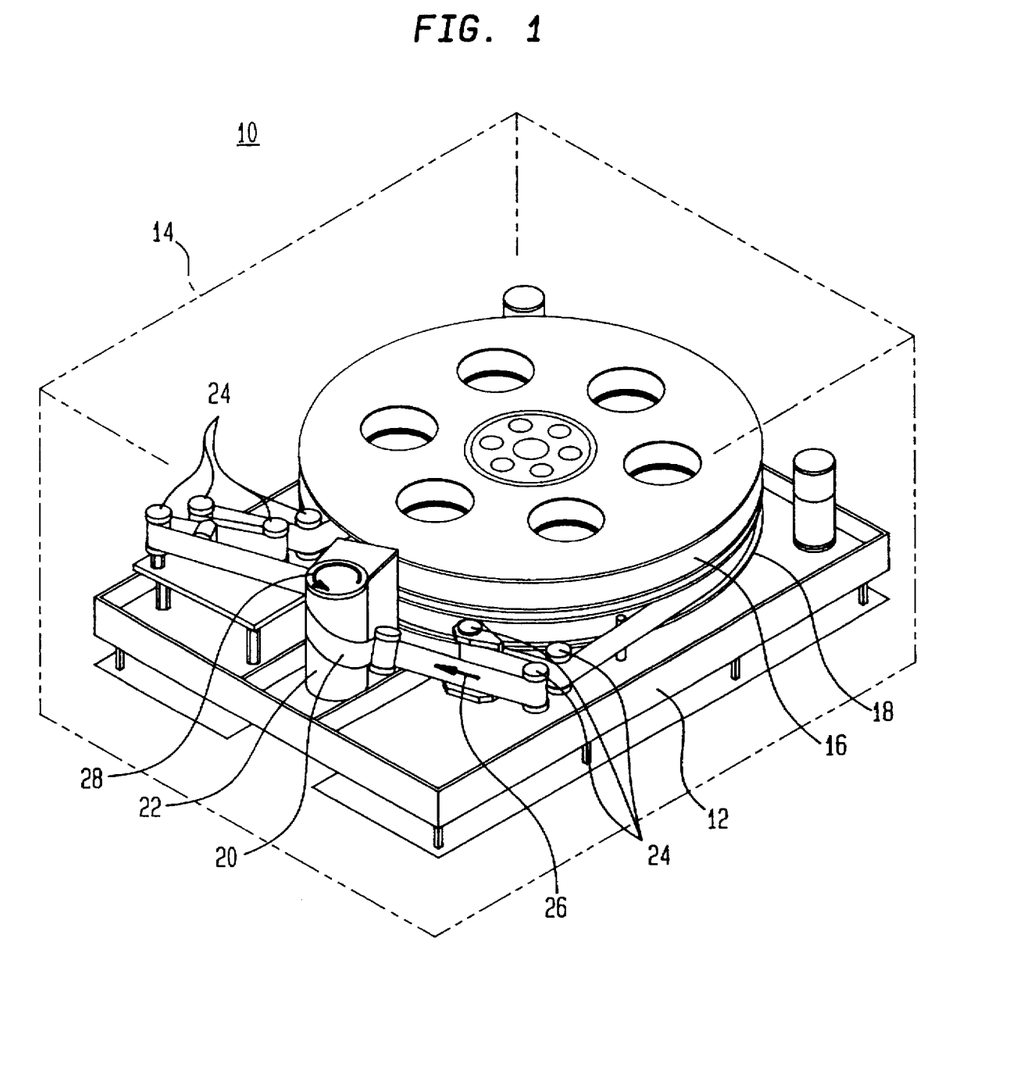
FIG. 1 is a schematic illustration of a high frequency tape record/reproduce system in which the present invention has utility.

Referring now to FIG. 1, there is shown a tape record/reproduce system 10 in which the present invention has utility. The general details of construction and principle of operation of the tape system 10 are well known in the art and will only briefly be described. Though not visible here, a magnetic record/reproduce head (or heads) used in the tape system 10 and provided in accordance with the present invention gives greatly extended service life and improved performance. The tape system 10 is intended for operation at frequencies as high or higher than 150 MHz. The tape system 10 comprises a frame 12, a housing 14 (indicated by the partially broken away dashed lines), tape reels 16 and 18, a length of magnetic tape 20, a rotatable head-support drum 22, and a plurality of tape-guide members 24 positioned on the frame 12 as indicated. Drive motors for the support drum 22 and the tape reels 16 and 18 are not shown. Other elements of the tape system 10 are conventional and are not described herein. The tape 20 is driven at high speed in the direction indicated by an arrow 26 up partly around and lightly against the support drum 22. The support drum 22 is rotated at high speed in the counter direction indicated by the curved arrow 28. A magnetic head (or heads) not visible here but mounted on the support drum 22 thus "scans" at very high speed closely spaced helical tracks across and along the inner, magnetic surface of the tape 20. The magnetic head, which is described in detail hereinbelow, mounted on the support drum 22 is kept in intimate contact with the magnetic surface of the tape 20 by a small positive pressure provided between the magnetic head and the tape 20.

Figure 2:
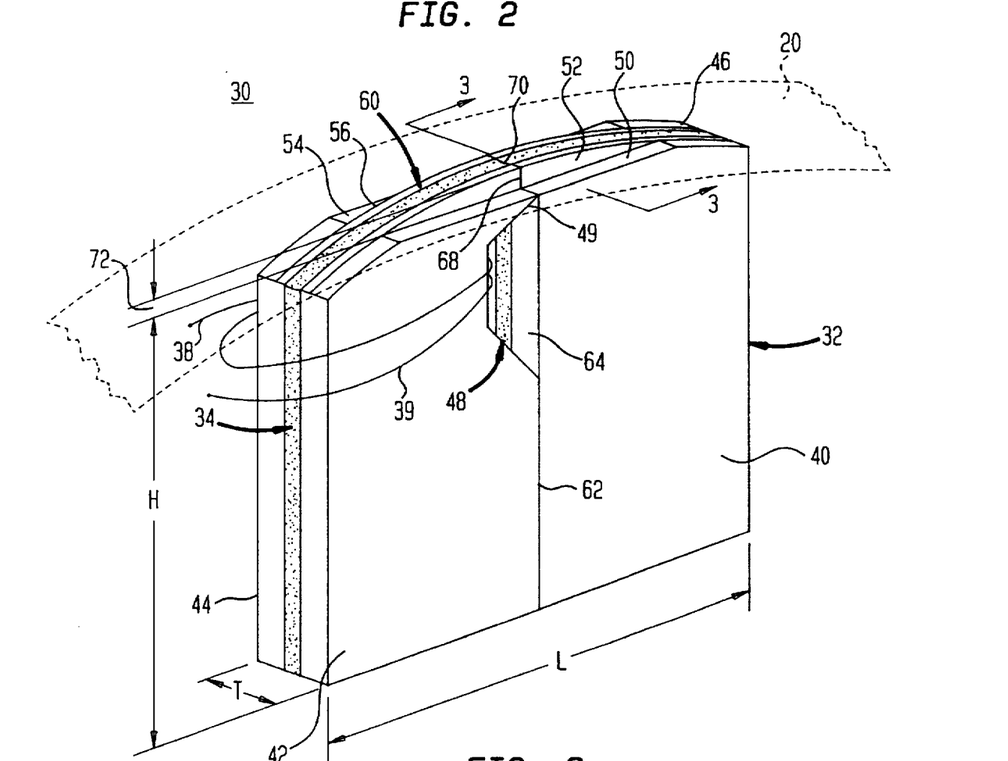
FIG. 2 is a greatly enlarged perspective view of a magnetic record/reproduce head provided in accordance with the invention and particularly suitable for use in the tape system of FIG. 1.

Referring now to FIG. 2, there is shown a greatly enlarged view of a magnetic record/reproduce head 30 provided in accordance with the present invention. A portion of the tape 20 is shown in dotted outline. The head 30 comprises a ceramic body 32 (also provided in accordance with the invention), a magnetic core 34 and an electric coil 36. The coil 36 has a pair of terminals 38 and 39 which are arranged to be connected to an electric circuit (not shown) and operated in conventional manner. The dimensions of length "L", height "H" and thickness "T" of the head 30 are as indicated. By way of example and to indicate the very small size of the head 30, "L" is about 2.5 mm, "H" about 1.9 mm, and "T" about 0.2 mm. The head 30 is mounted in a conventional manner on the support drum 22 (FIG. 1), and there may be more than one head 30 mounted on the drum 22.

The ceramic body 32 of the head 30 is, by way of example, made of four thin flat ceramic pieces 40, 42, 44 and 46 of approximately rectangular shape. The magnetic core 34 is bonded to and sandwiched between these ceramic pieces. There is a small cutout indicated at 48 in the ceramic pieces 42 and 44 (and the core 34) for the turns of the coil 36. Just above a top edge 49 of the opening 48, the front ceramic pieces 40 and 42 are cut away along a narrow horizontal surface 50 to leave a short vertical shoulder 52. The rear ceramic pieces 44 and 46 are similarly machined along a horizontal surface 54, only the left portion of which can be seen here, leaving a similar short vertical shoulder 56. The head 30 has a top surface 60 which is curved to conform to the inner surface of the tape 20 of the tape system 10 (FIG. 1) and which is highly polished to a finish measured in Angstroms with a profilometer.

The ceramic pieces 40 and 42, and the pieces 44 and 46, below the cutout 48 are bonded together along a vertical line 62. To achieve intimate contact of these pieces, and of the pieces of magnetic core 34 bonded to them, the opposing faces of the pieces 40, 42, 44 and 46 are ground flat and highly polished. One such face 64 of the ceramic piece 40 is shown, the other faces being obscured. A top portion of the ceramic pieces 42 and 44, (and the core 34) above the top edge 49 of the cutout 48 are ground back very slightly along a vertical plane indicated at 68 to provide a thin narrow magnetic air gap 70 for the head 30. The vertical depth of this air gap from the top of the surface 60 to the top edge 49 of the cutout 48 is indicated by the dimension 72. By way of example, the thickness of the air gap 70 is a small fraction of a micron, and the vertical depth 72 of the gap (which is orthogonal to the tape 20) is about 50 microns (about 2000 microinches). The air gap 70 is advantageously filled with $SiO_2$. This material may also be used as a "glue" to rigidly hold together the various ceramic parts of the head 30, as is well known in the art. It will be appreciated that certain dimensions of the head 30 are very small indeed, and that chipping and cracking of the ceramic material during machining and polishing can easily occur if the ceramic material is friable or prone to "fracture".

The presence of the magnetic air gap 70 is critical to the operation of the head 30. But as the head 30 rubs against the tape 20 during operation of the tape system 10 (FIG. 1), the top surface 60 of the head 30 is gradually worn down toward the top edge 49 of the cutout 48. When the depth 72 of the air gap 70 effectively reaches "zero", there occurs catastrophic failure of the head 30. In the case where the ceramic body 32 of the head 30 (with a core 34 of "Sendust") is made of "MN-130", failure of the head 30 occurs in as little as 800 hours of operation, depending on such factors as head-to-tape speed and pressure, type of tape, etc.

Figure 3:
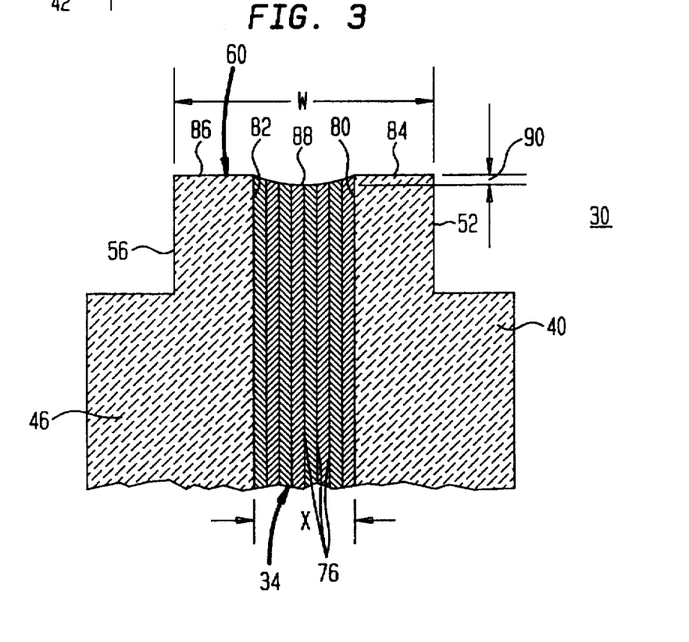
FIG. 3 is a further enlarged cross-section view (partially broken away) of the magnetic head taken as indicated by a dashed line 3—3 in FIG. 2.

Referring now to FIG. 3, there is shown (not to scale) a small portion of a greatly enlarged cross-section of the head 30. The right and left ceramic pieces 40 and 46 near their top ends are machined along the short vertical shoulders 52 and 56 (see also FIG. 2). As seen here, the magnetic core 34 is formed by laminating on top of each other a number of very thin layers of metal 76. The metal layers 76 may be formed by vapor deposition of a magnetic material such as "Sendust" and insulated apart by thin films of $SiO_2$, as is well known in the art. In order to obtain suitable magnetic properties (i.e., low coercivity and high permeability) of the core 34 after the head has been fabricated, it is desirable that the inner face 80 of the ceramic piece 40, and the inner face 82 of the ceramic piece 46 (and the similar faces of the ceramic pieces 42 and 44) be highly polished to a smooth finish measured in Angstroms. A finish on the ceramic pieces rougher than about 100 Angstroms can adversely affect the magnetic properties of the thin layers 76 as deposited on the faces 80 and 82 (and the inner faces of the ceramic pieces 42 and 44) during fabrication of the magnetic core 34 and the head 30. Thus the degree of smoothness (including absence of pores and voids) to which a surface of the ceramic pieces 40, 42, 44 and 46 can be finished is an important factor in obtaining high performance and efficiency from the magnetic head 30.

The top surface 60 of the magnetic head 30 is advantageously contoured and polished to near perfect degrees of dimension and smoothness by "run-in" in a conditioning machine (not shown but having a head support drum and tape handling mechanism very similar to those of the tape system 10 in FIG. 1). The "run-in" tape (not shown) is closely similar to the ordinary recording tape 20 but has a surface of finely divided diamond grinding compound. The magnetic head 30, after being thus "run-in", is conditioned and ready for use in the tape system 10 (FIG. 1). The top surface 60 of the head 30 comprises a highly polished face 84 of the ceramic piece 40 and a highly polished face 86 of the ceramic piece 46, with the top edges of the softer metal layers 76 being polished down a small amount more into a slightly concave face 88. The depth of the concave face 88 below the ceramic faces 84 and 86 (shown here in exaggerated relation for the sake of illustration) is indicated by the dimension 90. The metal layers 76 at the face 88 are polished away somewhat more than the ceramic faces 84 and 86 during the head-conditioning operation because there is a slight flexing of the "run-in" tape laterally across the head surface 60. The head 30 and the "run in" tape (and subsequently the tape 20) move relative to each other with a light contact force at high speed in a direction normal to the plane of FIG. 3.

A condition such as illustrated by the concave face 88 of the magnetic core 34 (and the dimension 90) is termed "washout". Some amount of "washout" is normal, because of the conditioning of the head 30 by the "run-in" tape as previously explained. It is desirable, however, from the standpoint of the sensitivity of the magnetic head 30 during operation of the tape system 10, that the face 88 of the magnetic core 34 be not eroded further relative to the level of the ceramic faces 84 and 88. This differential erosion can occur under certain conditions of operation, and where the wear rates of the ceramic faces 84 and 86 and the metal core 34 have too great a disparity. An incremental increase in the dimension 90 of only about 50 Angstroms causes about 1 dB loss in the sensitivity of the head 30 at a frequency of 150 MHz. Thus it is desirable to tailor the wear resistance of the ceramic faces 84 and 86 relative to that of the magnetic core 34 to obtain an optimum combination of service life and efficiency of the magnetic head 30. This is easily accomplished by virtue of the new ceramic material for the head 30 as provided in accordance with another aspect of the present invention. By way of example, the width "W" of the surface 60 is about 130 microns, the thickness "X" of the core 34 (with multiple layers 76) is about 20 to 40 microns, and the dimension 90 (of a newly conditioned head 30) about several hundred Angstroms.

Figure 4:
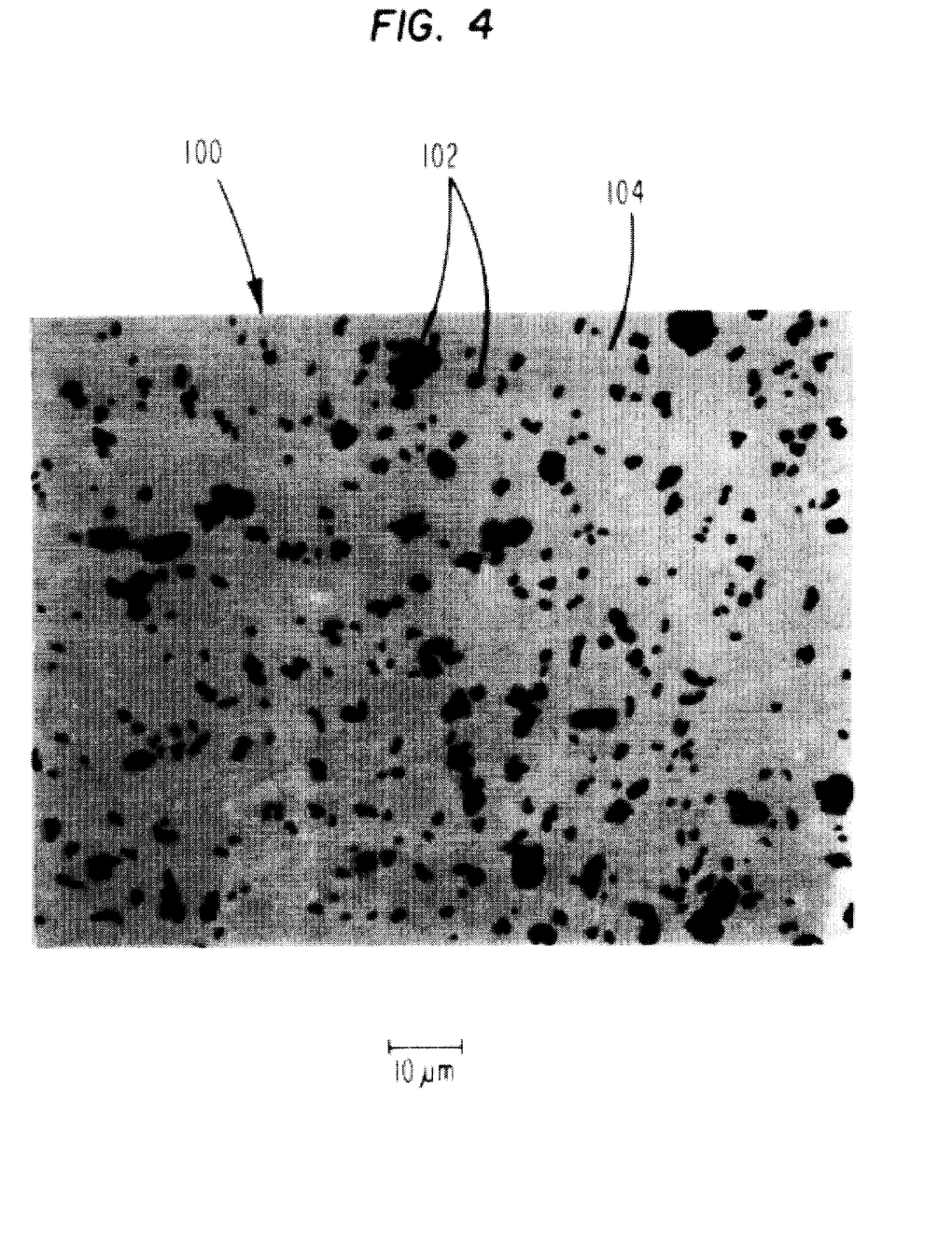
FIG. 4 is a very greatly enlarged photomicrograph showing a small portion of a highly polished surface of a new ceramic material also provided in accordance with the invention.

Referring now to FIG. 4, there is shown a photomicrograph (of approximately 1000 enlargement) of a small portion of a highly polished surface 100 (such as the top surface faces 84 and 86 of the ceramic pieces 40 and 46 of FIG. 3) of a new ceramic material, also provided in accordance with the present invention. The ceramic surface 100 here is polished to a smoothness of about 65 Angstroms as measured by a Sloan "Dektak" diamond stylus profilometer. There are randomly dispersed within the surface 100 a multitude of micron-size inclusions 102 seen as dark areas of irregular shapes and sizes. Spacings and dimensions may be judged by the 10 micron scale given here. On average, the inclusions 102 are substantially smaller than 10 microns, and they are very much smaller than the width of the face 84 of the ceramic piece 40 for example. The inclusions 102 (of a suitably hard material) are tightly bound as a second phase (not in solid solution) in a first phase ceramic matrix 104 seen as the overall light colored area. No third phase has been formed absent a reaction between the inclusions 102 and the ceramic matrix 104. The polished ceramic surface 100 is pore free and void free, and highly wear resistant. In the course of polishing the surface 100, the ceramic matrix 104 and the hard inclusions 102 are progressively worn away and sub-surface pores (if present) would be exposed. Also, if the inclusions 102 are not tightly bound in the ceramic matrix 104, some portions thereof might easily pull out of the matrix during polishing. This would otherwise leave microscopic voids in the surface 100. Moreover, if an inclusion 102 were to pull out of the tape-contacting surface 60 of the magnetic head 30 during operation of the tape system 10, the recording surface of the tape 20 could be damaged or ruined. A pore or void (i.e., a micro-hole) in the head surface 60 can collect debris which may seriously degrade the efficiency of the tape system. As explained previously, it is highly desirable to preclude such conditions from occurring. By way of example, the ceramic matrix 104 here is substantially pure calcium titanate (having no glass formers such as $SiO_2$ which substantially decrease wear resistance) and the inclusions 102 are 10 per cent by weight of substantially pure alumina having an average particle size of about 2 microns.

In accordance with still another aspect of the invention, an improved ceramic material especially suited for use in a magnetic head (such as the head 30 of FIGS. 2 and 3) is manufactured as follows:

Step 1. Raw Material Selection.

The materials chosen for this improved ceramic have coefficients of thermal expansion suitably matched to each other and to that of the metal core. They are physically and chemically compatible. In addition, the ceramic matrix material by itself has good machining and polishing properties, toughness and freedom from internal stresses, superior wear resistance and wear characterized by plastic deformation rather than by fracture. By way of example, a substantially pure metal titanate powder, such as calcium titanate powder, better than about 99.5% pure and having an average particle size of about 1.4 microns, is blended with a percentage by weight of finely divided hard metal oxide inclusions. The metal oxide inclusions are well calcined and are large enough (e.g., about two microns) to remain as identifiable inclusions as a second phase not in solid solution in the first phase matrix. Very small (e.g., one-tenth micron) metal oxide powders are sufficiently reactive to be dissolved in the matrix and thus not remain as identifiable inclusions in the matrix. The inclusions are advantageously alumina or zirconia and they are either in particle or fiber form. The use of fibers substantially increases the toughness of the overall ceramic. Increasing from zero to about 20% the weight of the inclusions in the overall ceramic increases the wear resistance of a calcium titanate ceramic matrix from about twice that of "MN-130" to better than 10 times the wear resistance of "MN-130". Increasing the percent of the inclusions to even as high as 20% does not significantly alter the thermal coefficient of expansion of the overall ceramic compared with that of the ceramic matrix material by itself (about $10.9 \times 10^{-6} °C.$). The size of the hard inclusions is roughly the same as that of the metal titanate particles. It is to be noted that calcium titanate is typically supplied commercially with a small amount (e.g., a few percent by weight) of $SiO_2$ which during sintering fills any small pores normally resulting in the fired ceramic. However the presence of even a fraction of a percent of $SiO_2$ (an amorphous glass former) substantially degrades the wear resistance of the ceramic material compared to that of a substantially pure calcium titanate ceramic (even without the inclusions of hard metal oxide).

Step 2. Powder Preparation.

The materials of Step 1 are blended in a binder solution (commercially available) to prepare a slurry. After the materials are well dispersed and wet by the binder, the slurry mixture is spray dried and the resulting powder sieved through a 100-mesh screen. Oversize particles are discarded.

Step 3. Powder Compaction.

The powder of Step 2 is compacted into a "green" ceramic piece in a cold isostatic press (well known to the art) at a final pressure of 40,000 psi. Air and water are removed from the ceramic piece before final compacting. After the "green" ceramic piece is compacted, the binder is burned out in a way conventional in the art.

Step 4. Sintering.

After binder burnout the "green" ceramic piece is sintered at about 1350° C. to consolidate the ceramic to a density of 95–97%. At this density the pores in the material are no longer interconnected and are isolated from one another and from the surface of the ceramic piece. Achieving this closed pore state is important for subsequent hot pressing to eliminate the pores entirely. An important aspect of the sintering operation, which is otherwise conventional, is control of the gas remaining in the pores. If the gas is non-permeable and unable to diffuse out of the ceramic during subsequent hot pressing, microscopic bubbles of gas in the pores become highly pressurized, resulting in a highly strained ceramic. To avoid this condition, the porous "green" ceramic is vacuum treated and then exposed to pure oxygen before and during sintering.

Step 5. Hot Pressing.

After sintering the ceramic part (in order to eliminate its residual porosity) is heated in a hot isostatic press (HIP). The ceramic part is placed in the HIP which is evacuated to a pressure of less than 150 microns, refilled with argon, and again evacuated and refilled several times. The HIP is then filled with argon to a pressure of about 6000 psi. Next, the HIP is gradually heated to a temperature of about 1325° C. at which point the gas pressure is about 25,000 psi. After a suitable amount of time at this temperature and pressure, the HIP is gradually cooled to room temperature, the gas pressure is released, and the part removed from the press.

Step 6. Oxygen Annealing.

During HIP'ing the calcium titanate is reduced because of the presence of graphite heaters in the HIP. This is corrected by reheating the piece to the sintering temperature (about 1350° C.) in a pure oxygen atmosphere. During this treatment oxygen diffuses into the calcium titanate and re-oxidizes it. This returns the material to its original color and non-conductive (electrically insulating) state. More importantly, the wear resistance of such a ceramic piece which is oxygen annealed is one-third greater than that of an unannealed piece of ceramic. Oxygen annealing after HIP'ing is thus an important step in obtaining highly wear resistant ceramic material.

Ceramic pieces produced according to the above-described Steps 1–6, have the following characteristics. The ceramic matrix of the fired ceramic pieces has small uniform grain size of substantially pure material (no glass formers). There is substantially uniform distribution of the inclusions as a second phase in the ceramic matrix (no third phase formed and no solid solution of the second phase). The thermal expansion coefficients of the ceramic matrix and of the inclusions are suitably matched to each other and to the thermal expansion coefficient of the metal in a core (such as the core 34) with the result that the ceramic and metal parts of a magnetic head (such as the head 30) can withstand wide temperature excursions (e.g., at least 500° C.). There are low residual stresses in the finished ceramic and the piece is highly resistant to wear and to chipping and cracking. The ceramic wears by deformation rather than by fracture when rubbing against a magnetic tape, for example. A very small piece of the ceramic can be polished on a surface face to a finish of less than 100 Angstroms and the face is pore free and void free, and remains so during use. These are important characteristics for a ceramic material intended for use in a magnetic head, such as the head 30.

The following Table 1 gives average specific wear rates of the new ceramics provided by the invention and produced according to Steps 1–6 (above) in comparison with the widely used ceramic "MN-130" (listed here as material number 1). "Wear Rate" is expressed in units of: "microinches of wear divided by the product of a million feet of tape multiplied by the pressure in psi of tape against the ceramic". The ceramic in material number 2 is substantially pure $CaTiO_3$ (calcium titanate) with "0%" inclusions. The calcium titanate composite materials numbers 3–9 have percent by weight of the hard inclusions, either $ZrO_2$ (zirconia) or $Al_2O_3$ (alumina) as listed. All the ceramic materials listed in Table 1 (numbers 1–9) were tested and measured under identical conditions.

TABLE 1

| Average Specific Wear Rates | |
| --- | --- |
| Material | Wear Rate |
| 1. "MN-130" | 40 |
| 2. $CaTiO_3$ | 21.7 |
| 3. $CaTiO_3$ + 2.5% $ZrO_2$ | 11.4 |
| 4. $CaTiO_3$ + 5.0% $ZrO_2$ | 8.9 |
| 5. $CaTiO_3$ + 10.% $ZrO_2$ | 6.3 |
| 6. $CaTiO_3$ + 20.% $ZrO_2$ | 2.6 |
| 7. $CaTiO_3$ + 5.0% $A_2O_3$ | 1.6 |
| 8. $CaTiO_3$ + 10.% $A_2O_3$ | 0.2 |
| 9. $CaTiO_3$ + 20.% $A_2O_3$ | <0.2 |

Table 1 shows that "MN-130" (material number 1 in Table 1) has a wear rate of 40 units. The higher the wear rate number the greater the amount of resulting wear of a head 30. By comparison, material number 2 (substantially pure $CaTiO_3$ produced according to Steps 1–6 given above) has a wear rate of 21.7 units. In other words, the wear resistance of pure calcium titanate by itself (no hard inclusions) is about twice that of the "MN-130" ceramic. By contrast, if the calcium titanate in accordance with prior practice contained a few percent of $SiO_2$ (a glass former), its wear resistance would be substantially less than that of "MN-130". Table 1 shows that material number 3, calcium titanate matrix with the addition of 2.5% of zirconia (produced according to Steps 1–6), has a wear rate of 11.4 units which translates into a wear resistance almost four times greater than that of "MN-130". Similarly, the addition of progressively larger percentages of zirconia to the calcium titanate matrix gives progressively lower wear rates of 8.9, 6.3 and 2.6 units, respectively, for materials 4, 5 and 6. The wear rate for material number 7, calcium titanate matrix with 5% addition of alumina inclusions, is 1.6 units, and for material number 8 (10% alumina) only 0.2 unit. This is one-twentieth the average specific wear rate of "MN-130" (material number 1), and indicates a wear resistance for material number 8 substantially greater than 10 times that of "MN-130". Material number 9, which is 20% alumina, has a wear rarer of less than 0.2 unit and is too small to measure with greater accuracy in this comparative measurement of wear rates. Table 1 illustrates that the wear rates of the new ceramics (materials 2–9) provided according to the above described Steps 1–6 of the present invention are easily tailored to the requirements of a magnetic head (such as the head 30) to give an optimum combination of service life compensation for head "washout", toughness, ease of machining fineness of polishing, etc.

The following Table 2 gives average surface finishes ($R_A$) measured in Angstroms on a "Dektak" profilometer for the materials 1–9 as listed.

TABLE 2

| Material | Surface Finish ($R_A$) Units in Angstroms |
|---|---|
| 1. "MN-130" | –20 –30 |
| 2. $CaTiO_3$ | 15 |
| 3. $CaTiO_3$ + 2.5% $ZrO_2$ | 16 |
| 4. $CaTiO_3$ + 5.0% $ZrO_2$ | 18 |
| 5. $CaTiO_3$ + 10.% $ZrO_2$ | 13 |
| 6. $CaTiO_3$ + 20.% $ZrO_2$ | 16 |
| 7. $CaTiO_3$ + 5.0% $Al_2O_3$ | 60 |
| 8. $CaTiO_3$ + 10.% $Al_2O_3$ | 66 |
| 9. $CaTiO_3$ + 20.% $Al_2O_3$ | 82 |

It will be seen from Table 2 that materials 2–6 can be polished to a slightly finer finish than "MN-130" (material number 1). Because of the much greater hardness of alumina compared to zirconia, materials 7, 8 and 9 can only be polished to a finish of about 60 to 82 Angstroms. However, this somewhat rougher finish is still satisfactory for use in a magnetic head, especially where extreme wear resistance is desired. By way of example, the Knoop hardness ($kg/mm^2$) of "MN-130" is about 750, of pure calcium titanate (material number 2) about 1000, and of zirconia about 1500 and alumina about 3000. Measurements show that the average hardness of materials 3–6 increases above the hardness of the material number 2 (pure calcium titanate) approximately linearly with the percent addition of zirconia inclusions. Similarly, the average hardness of materials 7–9 increases approximately linearly with the percent addition of alumina inclusions. The average specific wear rates given in Table 1 are approximately inversely related to average hardness of the materials 1–9. Tests of each of the ceramic materials 2–9 with a laminated core of "Sendust" show no measurable differences in magnetic properties compared to "MN-130" with a similarly laminated "Sendust" core.

It is to be understood that the magnetic head and the new ceramic material taught herein are illustrative of the general principles of the invention. Modifications may readily be devised by those skilled in the art without departing from the spirit and scope of the invention. For example, a material other than calcium titanate for the ceramic matrix, and hard inclusions other than the metal oxides disclosed may be used within the framework of the Steps 1–6, and the needed characteristics listed (e.g., wear resistance, compatible coefficient of thermal expansion, etc.). Still further, the invention is not restricted to the particular magnetic head 30, or to use at frequencies as high as 150 MHz, or to a particular set of dimensions and size of magnetic head. Core materials other than "Sendust", and magnetic record media other than tape may be used.

What is claimed is:

1. A magnetic head comprising:
   a magnetic core of a magnetic material, said magnetic material having a thermal coefficient of expansion;
   a ceramic body laminated to said magnetic core, said ceramic body including a ceramic matrix having small uniform grain size of substantially pure first ceramic material with no glass formers; and further including a substantially uniform distribution of inclusions of a second ceramic material, as a second phase in said ceramic matrix with no third phase formed, no solid solution of the second phase and no appreciable reaction between said first and second ceramic materials; wherein said thermal expansion coefficients of said first ceramic material, said second ceramic material and said magnetic material, respectively, are suitably matched to each other, with the result that said first and second ceramic materials can withstand wide temperature excursions without delamination; wherein said second ceramic material is harder than said first ceramic material; wherein said inclusions of said second ceramic material are of a size substantially comparable to said grain size of said ceramic matrix; wherein said ceramic substrate has low internal stresses and full density with no pores.

2. The magnetic head of claim 1 wherein said inclusions of said second ceramic material have an average size less than about 10 microns and are tightly bound in said ceramic matrix to resist pullout during wear of said magnetic head against a magnetic medium.

3. The magnetic head of claim 2 in which the average specific wear rate of the ceramic body is adjusted to between about 20 units and 0.2 units compared to an average specific wear rate of about 40 units for a manganese nickel oxide ceramic.

4. The magnetic head of claim 2 in which the ceramic matrix material is substantially pure calcium titanate, and the inclusions are selected from the group of metal oxides alumina and zirconia, the ceramic matrix and inclusions being compacted to pore free condition.

5. The magnetic head of claim 2 in which at least a portion of the magnetic core is deposited on a highly polished surface of the ceramic body as a layer of metal, the surface being free of micro-holes and being polished to a finish less than about 100 Angstroms, the ceramic body and the metal layer adhering to each other during wide excursions in temperature.

6. The magnetic head of claim 1 in which the ceramic matrix is a substantially pure metal titanate and the inclusions are a hard metal oxide such as alumina and zirconia.

7. The magnetic head of claim 6 in which the average grain size of the ceramic matrix and the average size of the inclusions are each about 2 microns.

8. The magnetic head of claim 6 in which the percent by weight of the inclusions is less than about 20%.

9. The magnetic head of claim 6 in which the head has a polished core-and-ceramic surface for contacting a recording medium, and a magnetic air gap orthogonal to the surface, the depth of the air gap below the polished surface being only about 50 microns, the wear resistance of the polished surface being selected to prevent "washout" and complete wear-away of the magnetic air gap for thousands of hours of service of the head.

10. The magnetic head of claim 6 in which the average hardness of the ceramic matrix and inclusions is greater than about Knoop 1000.

11. The magnetic head of claim 6 in which the head has a highly polished core and ceramic surface for contacting a recording medium, the width of the polished surface being of the order of 130 microns, the surface being polished to a finish finer than about 100 Angstroms and being substantially free of micro-holes.

12. The magnetic head of claim 6 in which the inclusions are very fine size hard fibers such that the toughness as well as the wear resistance of the ceramic matrix is increased.

* * * * *